Patented Nov. 28, 1950

2,531,403

UNITED STATES PATENT OFFICE 2,531,403

PROCESS FOR COAGULATING A LATEX OF A SULFUR DIOXIDE RESIN

Willie W. Crouch and Lawrence D. Jurrens, Bartlesville, Okla., assignors to Phillips Petroleum Company, a corporation of Delaware No Drawing. Application July 8, 1949, Serial No. 103,742

10 Claims. (Cl. 260—79.3)

This invention relates to the production of synthetic resinous materials formed by reaction between sulfur dioxide and one or more unsaturated organic compounds.

This invention pertains primarily to an improved method of coagulating such a resin when produced by polymerization in an aqueous emulsion.

It has been well known for a number of years that sulfur dioxide will react with numerous unsaturated organic materials to form heteropolymeric resinous products. Apparently the resin is produced from equimolar quantities of sulfur dioxide and the unsaturated organic material. The reaction appears to take place only in the liquid phase and it will proceed in the absence of catalysts only in the presence of actinic light, or it will proceed in the presence of any one of a large number of catalytic materials, most of which appear to have oxidizing properties, in the dark or in the light. Some of the more important catalysts for promoting this reaction are oxygen, hydrogen peroxide, ozone, various nitrates such as silver and lithium nitrates, nitrites, persulfates, chlorates, perchlorates, ascaridole, ozonized olefins, etc. Organic compounds which enter into the formation of such resins include mono-olefins, cyclo-olefins, substituted aliphatic olefins such as styrene, di-olefins such as butadiene, isoprene, cyclohexadiene, and the like, acetylenes and polyfunctional unsaturated compounds such as allyl alcohol, vinyl acetate, allyl ethyl ether, o-allylanisole, o-allylphenol, p-bromoallylbenzene, methyl undecylenate, undecylenyl alcohol, undecylenic acid, etc. When mixtures of such unsaturated organic compounds are used, the resulting resin appears to have been formed by a copolymerization of the unsaturated compounds with sulfur dioxide since its properties do not correspond to blends of resins produced from the individual unsaturated organic compounds and often have properties which are superior to any one of the resins produced from the individual unsaturated compounds. For many of the unsaturated compounds there appears to be a "ceiling temperature" above which the reaction does not take place, and in such instances it is necessary to conduct the resin-forming reaction at a temperature below the ceiling temperature and, when forming the resin from a mixture of organic unsaturated compounds, it appears desirable to conduct the reaction at a temperature below the ceiling temperature of the material having the lowest ceiling temperature. The resin-forming reaction is somewhat exothermic and generally some provision must be made for removing the heat of reaction. All of these features are more fully described in the literature.

The resins heretofore produced have generally been formed in the presence of only a moderate excess of sulfur dioxide and have been recovered as solid materials possessing a horn-like appearance or having a porous expanded form. These materials are tough and difficult to handle. In order to secure successful commercial products it has been necessary to grind these mechanically in order to form a finely divided material, thus facilitating removal of occluded impurities. Even when ground to a fine powder, it has often been difficult to remove completely all of the occluded impurities, such as uncombined reactants and other materials either present in the reactants as charged to the process or introduced in processing and handling the resin. In some instances it appears that the grinding procedure results in the introduction of minute quantities of metallic impurities which affect the clarity and general appearance of the molded products. Further, the grinding procedure develops undersirable heat which tends to soften the resin and cause the ground particles of resin to fuse, thus increasing the difficulty of the removal of impurities and in some instances resulting in an unsatisfactory molding powder because of particle size. Also, even if the grinding operation results in a satisfactory, fine powder, the removal of occluded impurities is difficult and expensive.

More recently a method has been found, and developed, whereby an unsaturated organic material and sulfur dioxide are caused to react to produce resinous products of various properties and wide adaptability, said products being readily freed from unreacted reactants and other impurities. The process comprises reacting the unsaturated compound and sulfur dioxide in aqueous emulsion in the presence of suitable catalysts and emulsifying agents. When the reaction is carried out in aqueous emulsion the material remains in a fluid condition and can be agitated readily, thus maintaining adequate contact of the reactants at all stages of the conversion. The resinous product, which is obtained in the form of an emulsion, can be stripped with steam to remove unreacted sulfur dioxide, unreacted unsaturated material, and other volatile impurities. It can also be readily washed and the removal of additional impurities is accomplished in this manner.

Since the sulfur dioxide is present to an appreciable extent in the aqueous phase, this is acidic and it is necessary to employ selected emulsifying agents which are effective at low pH, such as long chain alkyl sodium sulfates and the branched chain aliphatic or aromatic sodium sulfonates. However, latices produced using these emulsifying agents are very stable and difficult to coagulate. Methods of coagulating with brine and/or a mineral acid ordinarily fail to coagulate sulfur dioxide resin latices containing these selected emulsifying agents. Such coagulants may be successfully employed in these systems if unusually large quantities are employed, but economic considerations preclude the use of such quantities industrially. Heretofore, the usual method employed for coagulating sulfur dioxide resin latices has been by treatment with a brine-alcohol medium by which method is obtained a satisfactory finely divided coagulum. However, since this method requires rather large amounts of alcohol, the additional cost of providing and operating a recovery system for removing the alcohol from the serum must be borne. Further, an appreciable additional expense is represented by the alcohol left in the wet coagulum and lost during the drying of the polymer.

We have now found a novel and simple process for preparing sulfur dioxide resin latex by emulsion polymerization of sulfur dioxide and an unsaturated organic material, as discussed herein and generally referred to herein, for convenience, as sulfur dioxide resins, and coagulating same wherein the aforementioned difficulties are overcome. Our process for the production of sulfur dioxide resins by emulsion polymerization provides significant operating advantages by elimination of the need to add any coagulant to effect precipitation of the latex. By our process a latex of such a sulfur dioxide resin is first produced by emulsion polymerization, employing an emulsifying agent that contains an organic fatty acid ester linkage. After polymerization we age the latex in the presence of all or a portion of the residual unreacted sulfur dioxide at temperatures varying from about 30 to about 175° F. for a period of time which varies with specific conditions, hereinafter discussed. At the end of this period the latex coagulates, and the coagulum is recovered by the usual procedures.

An object of this invention is to produce a granular resin from sulfur dioxide and an unsaturated organic material.

Another object of our invention is to coagulate a resin from a latex.

A further object of this invention is to coagulate a sulfur dioxide-unsaturate resin latex produced by emulsion heteropolymerization.

Further objects and advantages of this invention will become apparent, to one skilled in the art, from the accompanying disclosure and discussion.

Emulsifying agents applicable in the present invention are those effective in acid media and which also contain an organic fatty acid ester group of a type derived from a primary or secondary alcohol. Examples of such materials are compounds of the formulas $RCOOCH_2SO_3M$ and $RCOOCH_2CH_2OSO_3M$, where R, in each case is a $C_{12}$ to $C_{18}$ aliphatic hydrocarbon radical, $RCOOCH_2CHOHCH_2OSO_3M$, a sulfated monoglyceride where R is a $C_{12}$ to $C_{18}$ aliphatic radical, and $R'OCOCH_2CHSO_3MCOOR'$, a dialkyl sulfo succinate where R' is a $C_6$ to $C_9$ aliphatic hydrocarbon radical, and where in each of the foregoing, M is an alkali metal. These materials are of the group of sulfate and sulfonates of aliphatic esters of carboxylic acids containing fourteen to twenty-two carbon atoms per molecule. The amount of such emulsifying agent used is such as to effectively emulsify the unsaturated organic comonomer during reaction, and is usually in the range of 1 to 10 parts by weight per 100 parts by weight of such comonomer material.

It was surprising and unexpected to discover that emulsifying agents of this type, although producing excellent, stable latices under the acidic conditions provided by the presence of dissolved sulfur dioxide, are rendered ineffective after a period of aging in the presence of the dissolved sulfur dioxide so that complete coagulation of the latex is effected. In this way the necessity for addition of any extraneous coagulant is eliminated, and thus no undesirable coagulant materials are present in the coagulated polymer.

In our process the period of aging necessary for coagulation is a function of (1) the temperature, (2) the emulsifying agent employed and to a lesser degree (3) the concentration of the sulfur dioxide dissolved in the latex. The latex should be sufficiently acidic to have a pH of 3 or lower. The aging period necessary decreases with increase in temperature and to a lesser degree with an increase in the acidity, or decrease in pH. A lower pH may be obtained by a higher concentration of residual sulfur dioxide, or in some instances it may be obtained by addition of a small amount of a strong mineral acid, such as sulfuric acid or hydrochloric acid, to a latex which has been freed from the bulk of unreacted sulfur dioxide. The amount of such added mineral acid is usually not greater than 2 per cent by weight of the latex.

The temperature of the latex during the aging period may lie in the range from about 30 to about 175° F., as previously stated, although temperatures between 70 and 160° F. are generally preferred.

While the aging period necessary varies considerably, from about 1 to 50 hours, depending on the choice of the aforementioned operating conditions, we generally prefer to operate under conditions such that the aging period does not exceed 25 hours.

Our process is not limited to any specific mechanism by which the coagulation is effected. It may be that the acidic condition, provided by the presence of dissolved sulfur dioxide in the latex, or by the added mineral acid, causes hydrolysis of the emulsifying agent at the ester linkage during the aging period. This destroys the emulsifying agent and the latex coagulates.

In producing the sulfur dioxide resins, any one of a number of unsaturated organic compounds may be used. Most of such reactants are those which will react with sulfur dioxide to produce heteropolymeric compounds, under the other conditions heretofore employed by the prior art. Most of such reactants contain an olefinic linkage, and may be represented by the formula

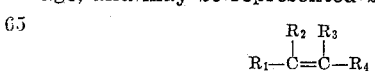

wherein $R_1$ and $R_2$ may be hydrogen, halogen, or alkyl; or $R_1$ may be a constituent of a carbocyclic ring in which $R_4$ is a member, and $R_3$ and $R_4$ may be hydrogen, alkyl, alkenyl, aryl, aralkyl, or have an acetylenic linkage or substituted groups thereof wherein substituents such as halo, nitro, hydroxyl, carbocyclic, cyano, and the like may be present, or $R_4$ may be a constituent of a carbocyclic ring in which $R_1$ is also a member. In general the olefinic compound employed will not contain more than twenty carbon atoms per molecule. Examples of olefinic compounds which may be used include 1-butene, 2-butene, propylene, isobutylene, pentenes, hexenes, cyclohexene, butadiene, styrene, alpha-methyl styrene, alpha-chloro styrene, vinyl acetylenes, vinyl chloride, vinyl bromide, and the like. It is also frequently desired to employ a mixture of olefinic compounds, rather than a single olefinic compound, in carrying out the process of this invention.

When operating according to the manner herein described it is generally found that substantially equimolar proportions of olefinic compound and sulfur dioxide react together. However, it is sometimes desired to use a molar excess of sulfur dioxide, say a 2:1 mol ratio of sulfur dioxide to olefinic material. In some cases it may even be desirable to use a higher ratio of the one reactant to the other, for example, a ratio of 5:1, or greater, depending upon operating conditions, olefinic material employed, amount of aqueous medium, etc., although it appears that, even in such cases, equimolar quantities of sulfur dioxide, and olefinic compound enter into reaction. Frequently it will be desirable to remove the reactants from the reaction zone, and separate unreacted materials, when between about 70 and about 97 per cent of the reactant present in the lesser amount has reacted. When some diolefins are used as reactants, under some conditions, these materials tend to undergo homopolymerization to form rubber-like products; such reactions are undesired in this invention and conditions should be chosen with such diolefinic reactants, to inhibit such homopolymerization and favor joint interreaction to produce heteropolymeric resins.

Catalysts applicable in this process are the same as those which have been found effective when carrying out the reaction between olefinic compounds and sulfur dioxide by methods heretofore employed. Examples of these catalytic materials include nitrates of the alkali metals and ammonium, nitric acid, potassium persulfate, hydrogen peroxide, organic peroxides, such as cumene hydroperoxide, peracetic acid, and the like. The amount of catalyst used may vary over a wide range and will depend upon the material chosen. In cases where alkali metal nitrates or ammonium nitrate are employed, the amount may vary from 0.03 to 0.60 part per 100 parts reactants with an amount ranging from 0.15 to 0.45 part being generally preferred. With other materials the quantity of catalyst used may be somewhat higher but in any event it is determined by the case at hand.

Temperatures for carrying out the resin-producing reactions of this invention will usually fall within the range of about 10 to about 140° F., with the narrower range 50 to 120° F. being most frequently preferred. However, in some instances it may be considered advisable to employ temperatures below 10° F. in order to get a more satisfactory reaction.

Obviously when polymerizations are carried out in aqueous emulsion in the absence of freezing point depressants, temperatures below the freezing point of the acidic aqueous medium cannot be employed. The use of various additive agents, however, makes a process of the type disclosed herein applicable at lower temperatures. An example of such a low temperature system is a glycerin-water solution, and the term "aqueous emulsion" should be construed to include the use of an aqueous medium comprising water and a sufficient amount of a water-soluble component to lower the freezing point below the desired polymerization temperature, whether or not the actual polymerization temperature is above or below freezing. It is generally preferred that the emulsion be of an "oil in water" type, with the ratio of aqueous medium to organic monomeric material between about 1.5:1 and about 10:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

Advantages of this invention are illustrated by the following examples. The reactants, and their proportions, and the other specific ingredients of the recipes are presented as being typical and should not be construed to limit the invention unduly.

*Example I*

An olefin-sulfur dioxide resin latex was prepared by emulsion polymerization according to the following recipe:

| | Parts by weight |
|---|---|
| 1-butene | 46.7 |
| Sulfur dioxide | 88.3 |
| Lithium nitrate | 0.5 |
| RCOOCH$_2$CH$_2$OSO$_3$Na [1] | 2.0 |
| Water | 180.0 |

[1] Arctic Syntex A, in which R is a $C_{12}$ to $C_{18}$ aliphatic hydrocarbon radical.

The reactants were emulsified in water and the mixture agitated throughout the reaction period while the temperature was held at 77° F. The reaction was stopped at the end of 6 hours, and most of the unreacted sulfur dioxide and the olefin were vented from the latex. The latex had a pH below 3 at this point. After standing at about 75° F. for 17 hours more the latex had coagulated in the form of very fine, white solid particles. It was filtered, washed with water and dried in an air oven.

*Example II*

An olefin-sulfur dioxide resin latex was prepared by emulsion polymerization using the following recipe:

| | Parts by weight |
|---|---|
| 1-butene | 46.7 |
| Sulfur dioxide | 88.3 |
| Lithium nitrate | 0.5 |
| RCOOCH$_2$CHOHCH$_2$OSO$_3$Na [2] | 1.5 |
| Water | 180.0 |

[2] Arctic Syntex M, in which R is a $C_{12}$ to $C_{18}$ aliphatic hydrocarbon radical.

The polymerization was effected in the same manner as in Example I. At the end of the reaction period of 6 hours a portion of the unreacted sulfur dioxide and the olefin were vented from the latex. The latex had a pH below 2 at this point. After standing at about 75° F. for 15.5 hours more the latex had coagulated in the form of very fine, white solid particles. It was filtered, washed with water, and dried in an air oven.

Example III

Two polymerization runs were carried out, using the recipes of Example I and Example II. In each run the charge was polymerized for 4 hours at 77° F. The latex was then removed and divided into three portions. Portion 1 of each latex was allowed to stand at room temperature (about 80° F.). Portion 2 was allowed to stand at 140° F. Portion 3 was mixed with 1 per cent (based on the weight of latex) of concentrated sulfuric acid and allowed to stand at room temperature. All were observed to determine the time required for coagulation. Results are shown below:

| Portion | Treatment | Time for Coagulation, Hours | |
|---|---|---|---|
| | | Arctic Syntex A | Arctic Syntex M |
| 1 | Stand at room temperature | 5.5 | 5.5 |
| 2 | Stand at 140° F | 3.5 | 3.5 |
| 3 | With 1% H₂SO₄ at room temperature | 2.25 | 2.25 |

As will be evident to those skilled in the art, various modifications of this invention can be made, or followed in the light of the foregoing disclosure and discussion, without departing from the spirit or scope of the disclosure or from the scope of the claims.

We claim:

1. An improved process for producing a granular heteropolymeric resin from 1-butene and sulfur dioxide, which comprises copolymerizing same in the presence of an emulsifying agent having the formula $RCOOCH_2CH_2OSO_3Na$ where R is a $C_{12}$ to $C_{18}$ aliphatic hydrocarbon radical, venting the bulk of the unreacted sulfur dioxide from a resulting latex so that said latex has a pH below 3, aging said latex at a temperature between 70 and 160° F. for 1 to 25 hours, whereby a coagulation of said latex takes place, and recovering a resulting granular heteropolymeric resin from said coagulated latex.

2. An improved process for producing a granular heteropolymeric resin from 1-butene and sulfur dioxide, which comprises copolymerizing same in the presence of an emulsifying agent of the class consisting of alkali metal sulfates and sulfonates of aliphatic esters of carboxylic acids having fourteen to twenty-two inclusive carbon atoms per molecule, venting the bulk of the unreacted sulfur dioxide from a resulting latex so that said latex has a pH below 3, aging said latex at a temperature between 70 and 160° F. for 1 to 25 hours, whereby a coagulation of said latex takes place, and recovering a resulting granular heteropolymeric resin from said coagulated latex.

3. An improved process for producing a granular heteropolymeric resin from 1-butene and sulfur dioxide, which comprises copolymerizing same in the presence of an emulsifying agent having the formula $RCOOCH_2CHOHCH_2OSO_3Na$ where R is a $C_{12}$ to $C_{18}$ aliphatic hydrocarbon radical, venting the bulk of the unreacted sulfur dioxide from a resulting latex so that said latex has a pH below 3, aging said latex at a temperature between 70 and 160° F. for 1 to 25 hours, whereby a coagulation of said latex takes place, and recovering a resulting granular heteropolymeric resin from said coagulated latex.

4. An improved process for producing a granular heteropolymeric resin from sulfur dioxide and an unsaturated organic compound which reacts therewith to form a heteropolymer, which comprises copolymerizing said reactants in the presence of an excess of sulfur dioxide in an aqueous emulsion and in the presence of an emulsifying agent of the class consisting of alkali metal sulfates and sulfonates of aliphatic esters of carboxylic acids having fourteen to twenty-two inclusive carbon atoms per molecule, and subsequent to said reaction aging a resulting latex while at a pH below 3 for a period sufficient to effect coagulation thereof.

5. The process of claim 4 in which said emulsifying agent has the formula $$RCOOCH_2CH_2OSO_3M$$

where R is a $C_{12}$ to $C_{18}$ aliphatic hydrocarbon radical and M is an alkali metal.

6. The process of claim 4 in which said emulsifying agent has the formula $$RCOOCH_2CHOHCH_2OSO_3M$$

where R is a $C_{12}$ to $C_{18}$ aliphatic hydrocarbon radical and M is an alkali metal.

7. The process of claim 4 in which said emulsifying agent has the formula $$R'OCOCH_2CHSO_3MCOOR'$$

where R' is a $C_6$ to $C_9$ aliphatic hydrocarbon radical and M is an alkali metal.

8. The process of claim 4 in which, prior to said aging, the bulk of the unreacted sulfur dioxide is removed from said resulting latex and sufficient sulfur dioxide is retained to maintain the pH of said latex below 3.

9. The process of claim 4 in which, prior to said aging, the bulk of the unreacted sulfur dioxide is removed from said resulting latex and a strong mineral acid is added to said latex in an amount such that said latex has a pH below 3.

10. The process of claim 4 in which, prior to said aging, the bulk of the unreacted sulfur dioxide is removed from said resulting latex and sulfuric acid in an amount not greater than 2 per cent of the latex is added to said latex.

WILLIE W. CROUCH.
LAWRENCE D. JURRENS.

No references cited.